United States Patent
Compert et al.

(10) Patent No.: US 10,225,397 B2
(45) Date of Patent: Mar. 5, 2019

(54) CALLER RELATIONSHIP AND RISK ASSESSMENT

(71) Applicant: International Business Machines Corporation, Armonk, NY (US)

(72) Inventors: Cindy E. Compert, Redondo Beach, CA (US); Elezaveta Koumpan, Stony Creek (CA); Jenny S. Li, Danbury, CT (US); Naghmana Majed, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/598,657

(22) Filed: May 18, 2017

(65) Prior Publication Data

US 2017/0353601 A1   Dec. 7, 2017

Related U.S. Application Data

(63) Continuation of application No. 15/175,064, filed on Jun. 7, 2016, now Pat. No. 9,699,305.

(51) Int. Cl.
*H04M 15/00* (2006.01)
*H04M 1/56* (2006.01)
(Continued)

(52) U.S. Cl.
CPC ........ *H04M 3/42042* (2013.01); *G06Q 50/01* (2013.01); *H04L 65/1069* (2013.01);
(Continued)

(58) Field of Classification Search
CPC ............ H04M 1/576; H04M 3/42042; H04M 3/42053; H04M 3/42161; H04M 3/42357;
(Continued)

(56) References Cited

U.S. PATENT DOCUMENTS 5,963,625 A   10/1999   Kawecki et al.
7,280,647 B2 *  10/2007   Henderson ............ H04M 1/576
                                                                379/142.01
(Continued)

OTHER PUBLICATIONS

Appendix P, List of IBM Patents or Patent Applications Treated as Related, 2 pages, dated May 19, 2017.
(Continued)

*Primary Examiner* — Binh Kien Tieu
(74) *Attorney, Agent, or Firm* — Christopher K. McLane

(57) ABSTRACT

The method includes identifying, by one or more computer processors, incoming data related to a source. The method further includes identifying, by one or more computer processors, data related to a recipient of incoming data from the source. The method further includes determining, by one or more computer processes, a relationship between the source and the recipient of the incoming data from the source. The method further includes calculating, by one or more computer processors, a risk indicator associated with the incoming data from the source based upon the identified data related to the source, the identified data related to the recipient and the determined relationship between the source and the recipient. The method further includes sending, by one or more computer processors, a notification to the recipient, wherein the notification includes at least the calculated risk indicator.

20 Claims, 4 Drawing Sheets

(51) Int. Cl.
*H04M 15/06* (2006.01)
*H04M 3/42* (2006.01)
*H04L 29/06* (2006.01)
*G06Q 50/00* (2012.01)
*H04M 3/436* (2006.01)

(52) U.S. Cl.
CPC ...... *H04L 65/1076* (2013.01); *H04L 65/1096* (2013.01); *H04M 3/42068* (2013.01); *H04M 3/436* (2013.01); *H04M 3/42382* (2013.01); *H04M 2203/556* (2013.01)

(58) Field of Classification Search
CPC .... H04M 3/436; H04M 3/5116; H04M 19/04; H04M 2203/6027; G06Q 30/02; G06F 21/316; G06F 21/577; H04L 63/14; H04L 63/1425; H04L 63/20
USPC ......... 379/88.08, 88.11, 88.12, 88.16, 88.19, 379/88.21, 93.17, 93.23, 114.14, 142.01, 379/142.04, 142.06, 142.17, 143, 144.03, 379/144.07, 145
See application file for complete search history.

(56) References Cited

U.S. PATENT DOCUMENTS

| | | | |
|---|---|---|---|
| 7,490,356 B2 * | 2/2009 | Lieblich | G06F 21/316 379/93.02 |
| 8,068,590 B1 * | 11/2011 | Kelson | G06Q 30/02 379/114.02 |
| 8,270,588 B2 | 9/2012 | Schwartz | |
| 8,325,900 B2 | 12/2012 | Trivi et al. | |
| 8,605,875 B2 | 12/2013 | Burchard et al. | |
| 9,100,455 B2 | 8/2015 | Li et al. | |
| 9,325,839 B2 | 4/2016 | Bender et al. | |
| 9,699,660 B1 | 7/2017 | Blatt et al. | |
| 2003/0002639 A1 | 1/2003 | Huie | |
| 2007/0088507 A1 * | 4/2007 | Haberlen | G06Q 40/025 702/19 |
| 2009/0125230 A1 | 5/2009 | Sullivan | |
| 2011/0211685 A1 | 9/2011 | Liu et al. | |
| 2012/0197967 A1 | 8/2012 | Sivavakeesar | |
| 2013/0268470 A1 | 10/2013 | Yablokov et al. | |
| 2013/0275352 A1 * | 10/2013 | Servi | G06N 3/08 706/21 |
| 2014/0201246 A1 | 7/2014 | Klein et al. | |
| 2015/0078542 A1 | 3/2015 | Sharpe | |
| 2015/0178736 A1 | 6/2015 | Hartig et al. | |
| 2015/0358459 A1 | 12/2015 | Spievak et al. | |
| 2016/0173687 A1 * | 6/2016 | Ehrlich | H04M 3/436 379/45 |
| 2017/0124852 A1 | 5/2017 | Pauws et al. | |
| 2017/0314939 A1 * | 11/2017 | Carter | G01C 21/34 |
| 2018/0152471 A1 * | 5/2018 | Jakobsson | G06Q 50/01 |

OTHER PUBLICATIONS

Compert et al., "Caller Relationship and Risk Assessment", U.S. Appl. No. 15/175,064, filed Jun. 7, 2016, 30 pages.

* cited by examiner

CALLER RELATIONSHIP AND RISK ASSESSMENT

BACKGROUND OF THE INVENTION

The present invention relates generally to telephone calls, and more particularly to analyzing incoming telephone calls.

A telephone, or phone, is a telecommunications device that permits two or more users to conduct a conversation when they are not in the same vicinity of each other. A telephone converts sound, typically and most efficiently the human voice, into electronic signals suitable for transmission via cables or other transmission media over long distances, and replays such signals simultaneously in audible form to its user.

A telephone comprises a microphone (transmitter) to speak into and an earphone (receiver) which reproduces the voice of the distant person. In addition, most telephones contain a ringer which produces a sound to announce an incoming telephone call, and a dial used to enter a telephone number when initiating a call to another telephone.

Caller identification (CID) is a telephone service available in analog and digital phone systems and most voice over Internet Protocol (VoIP) applications. CID transmits a caller's number to the called party's telephone equipment during the ringing signal, or when the call is being set up but before the call is answered. Where available, CID can also provide a name associated with the calling telephone number. The information made available to the called party may be displayed on a telephone's display, on a separately attached device, or on a personal computer.

SUMMARY

Aspects of the present invention disclose a method, computer program product, and system for calculating risk associated with a source. The method includes identifying, by one or more computer processors, incoming data related to a source. The method further includes identifying, by one or more computer processors, data related to a recipient of incoming data from the source. The method further includes determining, by one or more computer processes, a relationship between the source and the recipient of the incoming data from the source. The method further includes calculating, by one or more computer processors, a risk indicator associated with the incoming data from the source based upon the identified data related to the source, the identified data related to the recipient and the determined relationship between the source and the recipient. The method further includes sending, by one or more computer processors, a notification to the recipient, wherein the notification includes at least the calculated risk indicator.

DETAILED DESCRIPTION

Embodiments of the present invention recognize that many telephone calls are received from an unknown source. Embodiments of the present invention recognize that a user may be more apt to answer a phone if the user has information regarding the source of the call. Some users may not answer a call from an unknown number, and therefore, miss an important call. Embodiments of the present invention recognize that calls originating from specific regions may be more than likely unwanted.

Implementation of embodiments of the invention may take a variety of forms, and exemplary implementation details are discussed subsequently with reference to the Figures.

Figure 1:
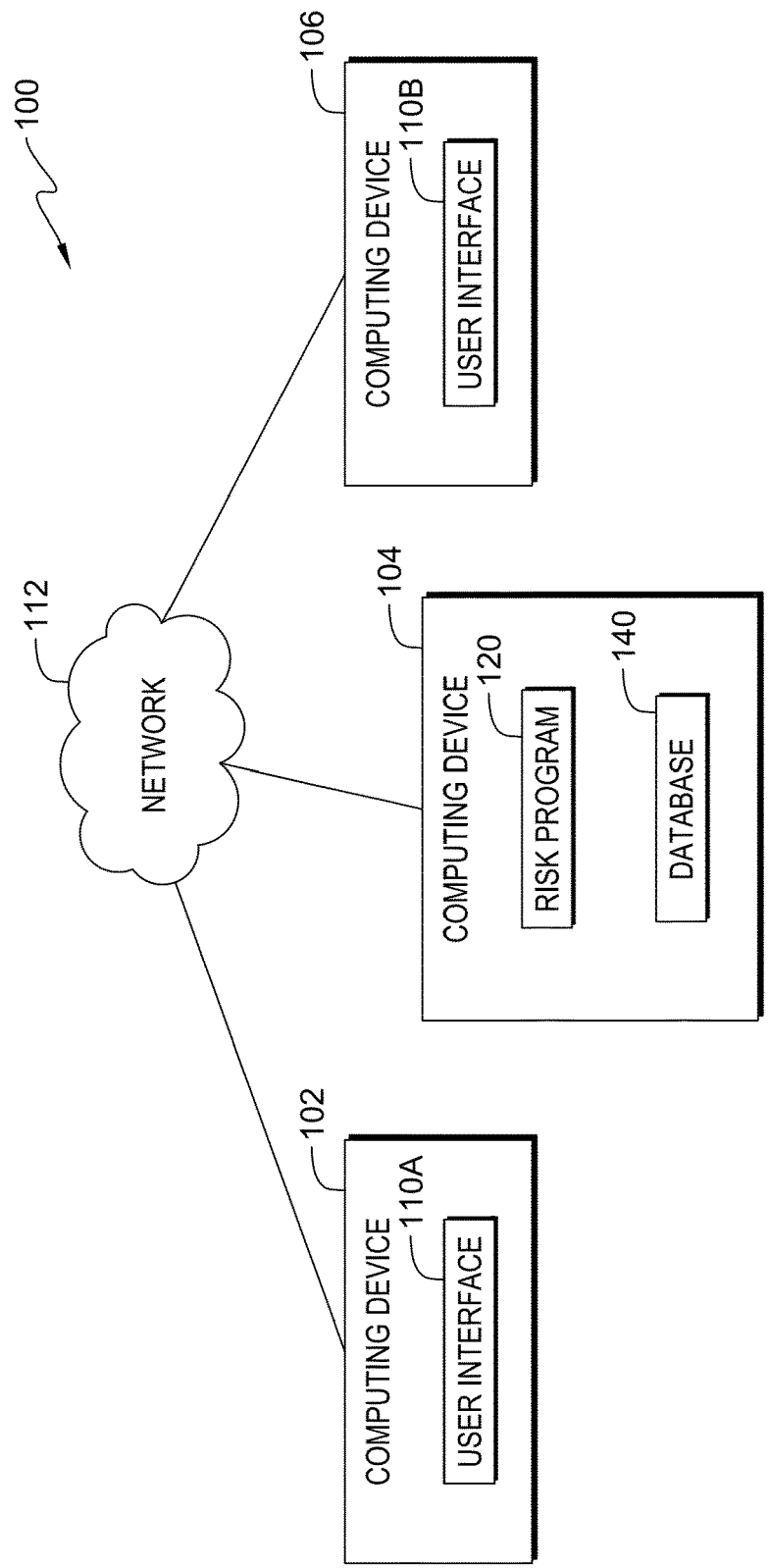
FIG. 1 is a functional block diagram illustrating a distributed data processing environment, in accordance with one embodiment of the present invention.

The present invention will now be described in detail with reference to the Figures. FIG. 1 is a functional block diagram of computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted environment, computing environment 100 includes computing device 102, computing device 104 and computing device 106 connected to network 112. Network 112 may be a local area network (LAN), a wide area network (WAN), such as the Internet, a cellular data network, any combination thereof, or any combination of connections and protocols that will support communications between computing device, in accordance with embodiments of the invention. Network 112 may include wired, wireless, or fiber optic connections. Network 112 includes one or more wired and/or wireless networks that are capable of receiving and transmitting data, audio, and/or video signals, including multimedia signals that include audio, data, and video information. Computing environment 100 may include other devices not shown that are able to communicate with computing device 102, computing device 104 and computing device 106 via network 112. Examples of other computing devices may include other computing devices, telephones, or any other device used in telephonic or digital communication in computing environment 100.

In the depicted computing environment 100, computing device 102 and computing device 106 may be any computing device, such as one or more of a telephone, a desktop computer, a laptop computer, a tablet computer, a specialized computer server, a smart phone, any combination of telephone and/or computer, or any programmable electronic device capable of sending and/or receiving telephone calls and digital information and communicating with computing device 104 and another client device via network 112, and with various components and devices within computing environment 100. In one embodiment, client device 102 and client devices 106 represent any telephone capable of executing machine readable program instructions and/or data storage as a standalone device or as used in conjunction with another electronic device via a network, such as network 112.

A telephone, or phone, is a telecommunications device that permits two or more users to conduct a conversation when the users are not in the same vicinity of each other. A telephone converts sound, typically the human voice, into electronic signals suitable for transmission via cables or other transmission media over long distances, and replays such signals in audible form to a user. A telephone may include additional services, such as visual displays and buttons for communicating with another user via a textual message or video message. Computing device 102 includes user interface 110A. Computing device 106 includes user interface 110B. In some embodiments, computing device 102 and computing device 106 may include a client based risk program that enables a user to utilize a risk program (e.g., risk program 120) on a local device. In other embodiments, a client based risk program may interact with a server based risk program (e.g., risk program 120). Computing device 102 and computing device 106 may include components as depicted and described in further detail with respect to FIG. 4, in accordance with embodiments of the present invention.

In the depicted computing environment 100, user interface (UI) 110A resides on computing device 102 and UI 110B resides on computing device 106. UI 110A and UI 110B are computer programs that provides an interface between a user and computing device 102 and computing device 106 respectively. A user interface refers to the information, such as graphic, text, and sound, a program presents to a user, and the control sequences the user employs to control the program. There are many types of user interfaces. In an embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements by the user. In some embodiments, UI 110A and UI 110B may be subprograms or functions of risk program 120, which allow a user to interact with risk program 120.

In the depicted computing system 100, computing device 104 may be any computing device. In some embodiments, computing device 104 is one or more of a management server, a web server, or any other electronic device or computing system capable of receiving and sending data. In other embodiments, computing device 104 represents a server computing system utilizing multiple computers as a server system, such as in a cloud computing environment. In another embodiment, computing device 104 represents a laptop computer, a tablet computer, a netbook computer, a personal computer (PC), a desktop computer, a personal digital assistant (PDA), a smart phone, or any programmable electronic device capable of communicating with client device 102 and client device 106 via network 112. In another embodiment, computing device 104 represents a computing system utilizing clustered computers and components to act as a single pool of seamless resources. In one embodiment, computing device 104 can be a server operating for a telephone service provider. In another embodiment, computing device 104 may operate independently and one or more service providers may utilize the capabilities of computing device 104. Computing device 104 includes risk program 120 and database 140. Computing device 104 may include components as depicted and described in further detail with respect to FIG. 4, in accordance with embodiments of the present invention. In some embodiments, computing device 104 may include additions programs, databases, or interfaces which are not depicted.

In the depicted computing environment 100, risk program 120 receives data regarding a telephone call occurring, determines the risk associated with the phone call for the recipient, and sends a risk assessment of the source to the recipient of the phone call. A source can be referred to as a caller, and a recipient can be referred to as a callee. For example, risk program 120 resides on a server employed by a telephone service provider. When a user dials a phone number risk program 120 identifies the source and the recipient of the phone call and determines the risk associated with the source of the call. In some embodiments, risk program 120 may allow a source (e.g., a user of computing device 102) to input additional information prior to dial a number. In other embodiments, risk program 120 may access a database (e.g., database 140) to identify information pertaining to the source and/or past contact with the recipient of the call (e.g., computing device 106). In yet other embodiments, risk program 120 may access outside servers, websites, databases, etc. to identify more information pertaining to the source of the call. In various embodiments, risk program 120 may calculate a risk indicator based upon user presets, service provider presets, other source tendencies, other recipient tendency, recipient feedback, etc. A risk indicator may include a score, a message, a recommendation, etc. In some embodiments, risk program 120 may be located on multiple computing devices (e.g., a cloud environment) and interact with multiple users. In another embodiment, risk program 120 is a program operated independently and is utilized by multiple service providers. In another embodiment, risk program 120 is located on multiple client devices (e.g., computing devices 102 and 104) and operates in a peer to peer mode without a server. In yet another embodiment, risk program 120 may operate on client devices in conjunction with one or more servers, such as computing device 104 being a server. Risk program 120 is depicted and described in further detail with respect to FIG. 2 and FIG. 3.

In the depicted computing environment 100, database 140 resides on computing device 104. Database 140 may be a repository that may be written to and/or read by risk program 120, or users of risk program 120. A database is an organized collection of data. In some embodiments, various user setting may be stored in database 140. In various embodiments, database 140 may contain user feedback for a specific telephone number, user name, company, etc. In some other embodiments, database 140 may contain user and/or administrator settings for a source number based upon location, time of day, past history, etc. In other embodiments, database 140 may reside on a personal computer, another computing device (not depicted), or independently as a standalone database that is capable of communicating with computing device 104 via network 112.

Figure 2:
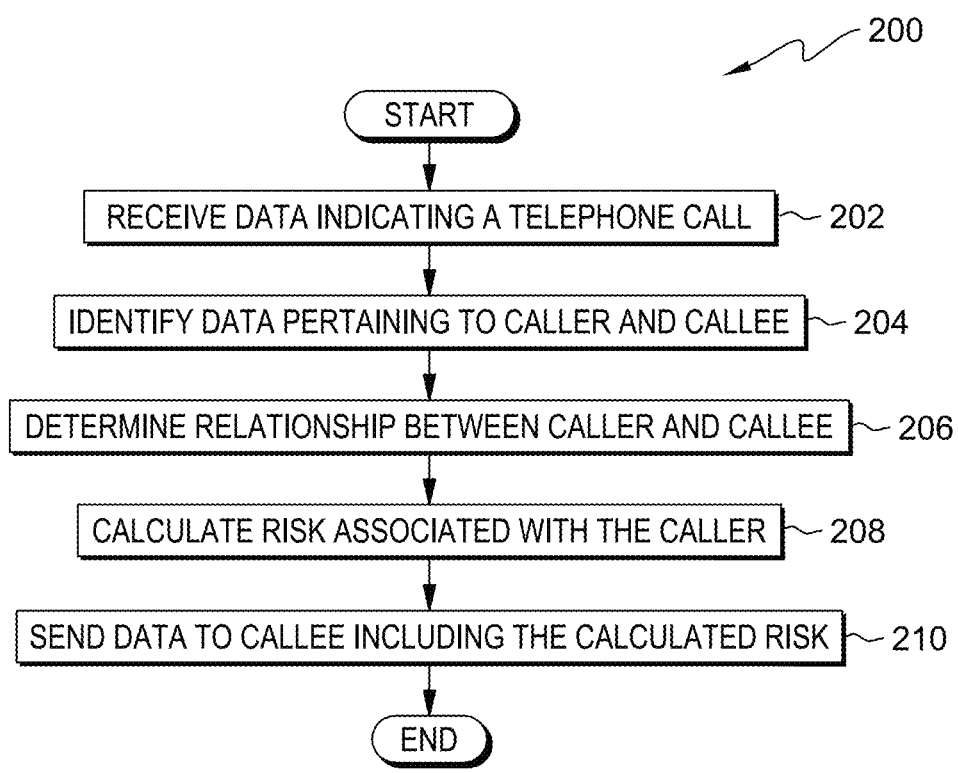
FIG. 2 depicts a flowchart depicting operational steps of analyzing a telephone call, executing within the computing system of FIG. 1, in accordance with one embodiment of the present invention.

FIG. 2 is a flowchart depicting operational steps of program 200, which is a function of risk program 120, in accordance with an embodiment of the present invention. The steps of program 200 may happen in another order. Some steps depicted in FIG. 2 may be skipped and other steps may be added. In some embodiments, the operational steps of program 200 begin in response receiving data indicating an outgoing or incoming telephone call. In other embodiments, the operational steps of program 200 begin in response to a user activating program 200. In some embodiments, a user may have preset timeframes for program 200 to begin, such as between specific hours.

Program 200 receives data indicating a telephone call (step 202). In one embodiment, program 200 receives a telephone call from computing device 102 that is directed to computing device 106. In another example, computing device 106 dials the telephone number for computing device 102, and the call first is routed through a service provider that utilizes program 200. Program 200 receives the information associated with the incoming telephone call (e.g., the number calling, the data representing a number such as private, a mixture of characters, the name of a company associated with the telephone number, etc.). In various embodiments, program 200 is utilized by a service provider and outgoing calls are routed through a service provider database. Program 200 identifies outgoing calls and the intended recipients of the outgoing calls. In some embodiments, program 200 may not identify a telephone call but rather an incoming digital message in text, visual, or audio form.

Program 200 identifies data pertaining to the caller and the callee (step 204). In various embodiments, program 200 may identify data pertaining to the caller from a local database (e.g., database 140) and/or a database utilized by a service provider. In some embodiments, program 200 may identify data pertaining to the caller via the Internet, such as social media sites, Internet searches, etc. In an example, program 200 may receive and identify an outgoing telephone call is originating from a specific area code, country code, etc. Program 200 can then identify the location of origin for the telephone call based upon the code. In one example, program 200 may identify the location based upon stored data. In another example, program 200 may run a query on the Internet to determine the location of origin based upon the telephone number.

In some embodiments, program 200 may analyze the content of a message if available. For example, a caller sends a voice or text message to a callee, rather than place a telephone call. In this example, program 200 may analyze the message utilizing natural language processing (e.g., sentence splitting, tokenization, part of speech tagging, chunking, dependency parsing, anaphora resolution, and the like) to determine the language or origin, and identify the tone of the message. In some examples, program 200 identifies key words or phrases in an outgoing message. For example, program 200 identifies matching words from a database (e.g., database 140) and the outgoing message. The database may have a list of trigger words that correspond to different risk ratings. Some words may equate to a more negative score, while others may equate to a more positive score. In yet other embodiments, program 200 may identify key words to present the callee. For example, program 200 may identify a subject of a message via speech or text analytics and present a summary of the message.

Program 200 determines the relationship between the caller and the callee (step 206). In some embodiments, program 200 may determine a relationship between a caller and callee by searching social media and/or social network websites for connections. For example, program 200 may identify that a caller is the mother of the callee via social network. In another example, program 200 may identify that the caller and the callee share multiple friends on a social network. In another embodiment, program 200 may query a contact list on the caller's and/or callee's phone to determine if there is any relationship between the caller and callee. For example, the caller may be listed as a store in the contact list of the callee's phone (e.g., computing device 106). In some embodiments, program 200 identifies user feedback for the caller in a database (e.g., database 140). For example, a user of a service provider previously stored information regarding a telephone number, such as the telephone number is a sales call, in the service provider's database (e.g., database 140). Program 200 determines that the caller is an unsolicited phone call regarding sales, and the caller and the callee have no previously stored contacts.

In some embodiments, program 200 enables the caller to include extra information along with a call (e.g., a audio message, text, a picture, video, hyperlink, etc.). For example, program 200 may provide a text box to enter information (e.g., the caller's name and purpose of the call). The information can later be presented to the callee alone with a risk assessment. Program 200 may also utilize the provided information to help in determining the relationship between the caller and callee. In some embodiments, a user may preselect for program 200 to show a callee message if one has been provided by the callee. In other embodiments, a user may select to only see the risk assessment, which may or may not be based off of information entered by the caller prior to placing the telephone call. In some embodiments, program 200 may receive data along with a telephone call from another program or subprogram from the caller. In yet other embodiments, a callee may receive extra information prior to establishing a connection between the caller and the callee.

Program 200 calculates a risk associated with the caller (step 208). In various embodiments, program 200 calculates a risk associated with a call based upon the identified data pertaining to the caller and callee, and the determined relationship between the caller and callee. In some embodiments, a user of program 200 may preset weights for categories utilized to calculate a risk score. In an example, the user may preselect a high value to be associated with the originating location of the call. In another example, the user may preselect a high value to be associate with a relationship with the caller (e.g., degrees of separation). In some embodiments, program 200 may have weights assigned by administrators (e.g., programmers and/or service providers). In yet other embodiments, program 200 may adjust factor weights based upon user feedback. In some examples, a callee may be presented with a user response box. The callee may adjust weight factors for the caller or similar callers and/or may select to give an overall risk rating. If a callee sends feedback on a call, program 200 stores the feedback in a database (e.g., database 140) and utilizes the stored feedback (e.g., information from step 204) when calculating future risk scores.

In some embodiments, program 200 may monitor the length of a previous call from the caller to the callee, or the caller to another callee. Program 200 may identify that 70 percent of previous calls placed by the caller lasted under 30 seconds. Program 200 then determines that because the majority of phone calls placed by the caller are short, the risk associated with the caller is higher. In some embodiments, program 200 may monitor texts, voice or video messages previously sent by a caller and determine a risk score based upon the language utilized and/or tone used. For example, program 200 identifies multiple keywords are utilized in various text messages from a caller, and the user has preselected to increase risk when the keywords are identified. Program 200 may increase a risk score if caller details from step 204 are missing, such as a photo, location, date of birth, occupation, etc.

In some embodiments, program 200 builds a relationship network graph to highlight the caller and callee relationship and the strength or weakness of the links. For example, the caller only has one common associate with the callee. The relationship factor for the caller and callee is week, and therefore, the risk is greater. In another example, program 200 determines that the originating location of the caller is one block from the receiving location of the callee, and therefore, the risk is lower. In some embodiments, program 200 may include a confidence score along with the risk score. For example, program 200 has limited information regarding a caller, and therefore, includes a low confidence score indicating that the risk score isn't as reliable.

Program 200 sends data to the callee including the calculated risk (step 210). In various embodiments, program 200 sends a notification to the callee including a risk associated with the caller and additional data regarding the caller. In some embodiments, a user may configure the notification via a UI (e.g., UI 110A and/or UI 110B). For example, a user may configure notification to have various options, such as receive the incoming message/call, reject the message/call, block the originating number from sending information again, and/or report the message/call. In other embodiments, program 200 may include information obtained and calculated in steps 204 through 208. In yet other embodiments, program 200 may have a notification template configured by administrators (e.g., a service provider) to display information deemed important. In various embodiments, a user of program 200 may customize a notification to display multiple different items related to an incoming call, text, message, etc. For example, program 200 may display a picture, an originating location, a number of calls originating from the number per day, a risk score, key words and/or a summary of a message, a graph displaying degrees of separation, or any other information program 200 may gather. Program 200 may also incorporate user feedback. For example, if a specific callee always rejects calls with a risk score over 6 and blocks calls over 8 on a 0 through 10 scale, program 200 may recommend the same actions in the future. In some examples, program 200 may block or reject calls based upon previous user actions (e.g., a user always blocks calls over a specific risk score). In some embodiments, program 200 may allow a user (e.g., callee) to see an extended profile for an incoming message or call before making a decision on accepting the incoming message or call.

Figure 3A:
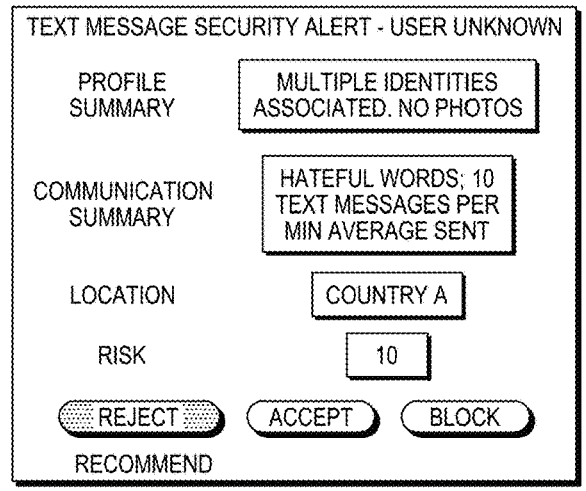
FIG. 3A depicts a potential risk assessments presented to a user based upon an incoming telephone call.
Figure 3B:
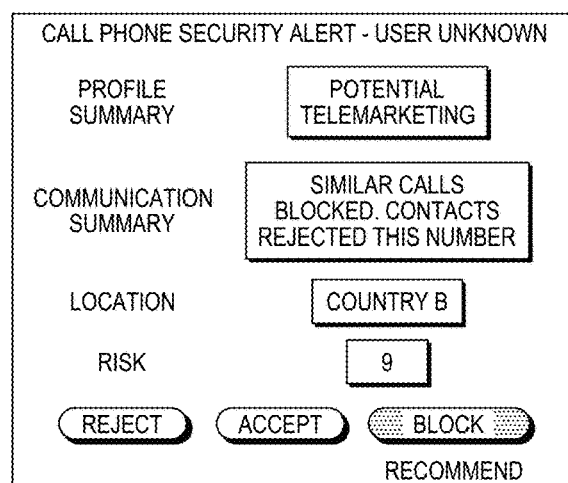
FIG. 3B depicts a potential risk assessments presented to a user based upon an incoming telephone call.
Figure 3C:
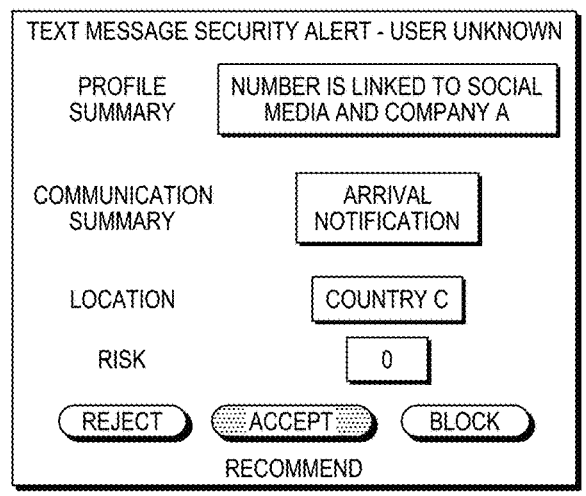
FIG. 3C depicts a potential risk assessments presented to a user based upon an incoming telephone call.

FIGS. 3A, 3B, and 3C are examples of notifications sent to a callee regarding the caller. In various embodiments, program 200 may generate a profile containing previously identified information pertaining to the caller. In some embodiments a user of risk program 120 may select which items to include in a profile summarizing the caller.

In FIG. 3A, program 200 identifies that the callee has an incoming text message from an unknown user. Program 200 includes a profile summary. In FIG. 3A, program 200 identifies multiple identities associated with the telephone number, but cannot locate any photographs for any of the identities. In a communication summary, program 200 also identifies that multiple text messages are sent to various other telephone numbers per minute (e.g., 10 per minute). The identified text messages also include hateful words identified in a keyword search of the incoming message. Program 200 identifies that the originating location of the caller is from Country A, but the callee is not from Country A and has no affiliations with Country A. Based upon all the information gathered for the incoming text message in FIG. 3A, program 200 calculates that the incoming message is of high risk (e.g., risk score of 10), and that the incoming message should be rejected.

In FIG. 3B, program 200 identifies that the callee has an incoming phone call from an unknown user. Program 200 includes a profile summary. In FIG. 3A, program 200 identifies that the number is from a potential telemarketing company. In a communication summary, program 200 identifies that similar calls originating from the caller have been blocked or rejected. Program 200 identifies that the originating location of the caller is from Country B, but the callee is not from Country B and has no affiliations with Country B. Based upon all the information gathered for the incoming text message in FIG. 3B, program 200 calculates that the incoming telephone call is of high risk (e.g., risk score of 9), and that the incoming message should be blocked.

In FIG. 3C, program 200 identifies that the callee has an incoming text message from an unknown user. Program 200 includes a profile summary. In FIG. 3A, program 200 identifies that the number is linked to User A's social media and/or network account and company A. Social media can also mean social network. In a communication summary, program 200 identifies that the text contains arrival information of a flight. Program 200 identifies that the originating location of the caller is from Country C, and the callee is currently in Country C. Based upon all the information gathered for the incoming text message in FIG. 3C, program 200 calculates that the incoming telephone call is of low risk (e.g., risk score of 0), and that the incoming message should be accepted.

Figure 4:
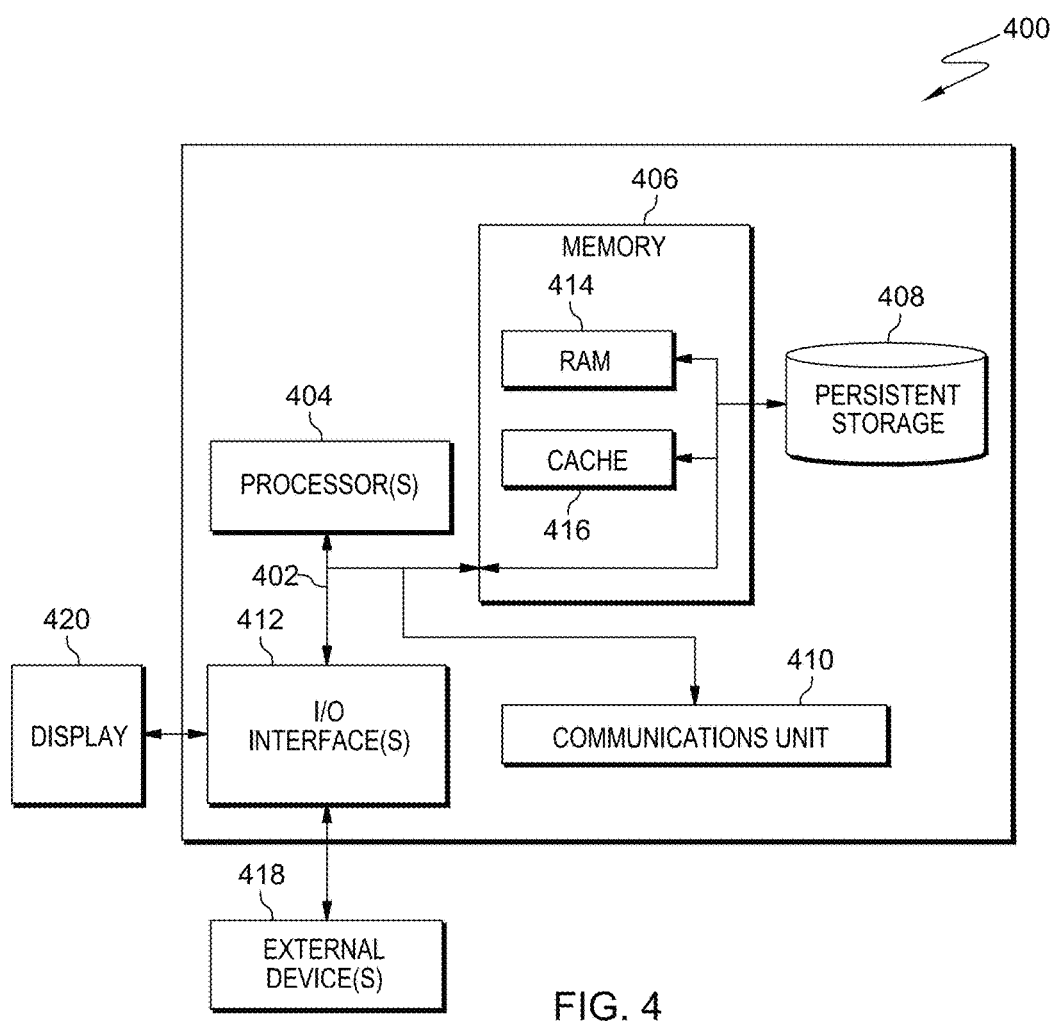
FIG. 4 depicts a block diagram of components of the server and/or the computing device of FIG. 1, in accordance with another embodiment of the present invention.

FIG. 4 depicts a block diagram of components of computing device 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM) 414. In general, memory 406 can include any suitable volatile or non-volatile computer readable storage media. Cache 416 is a fast memory that enhances the performance of computer processor(s) 404 by holding recently accessed data, and data near accessed data, from memory 406.

UI 110A, UI 110B, risk program 120, and database 140 may be stored in persistent storage 408 and in memory 406 for execution and/or access by one or more of the respective computer processor(s) 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. UI 110A, UI 110B, risk program 120, and database 140 may be downloaded to persistent storage 408 through communications unit 410.

I/O interface(s) 412 allows for input and output of data with other devices that may be connected to computing device 400. For example, I/O interface(s) 412 may provide a connection to external device(s) 418, such as a keyboard, a keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., UI 110A, UI 110B, risk program 120, and database 140, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for calculating risk associated with a source, the method comprising:
    identifying, by one or more computer processors, incoming data related to a source;
    identifying, by one or more computer processors, data related to a recipient of incoming data from the source;
    determining, by one or more computer processes, a relationship between the source and the recipient of the incoming data from the source;
    identifying, by one or more computer processors, one or more key words from a textual message from the source;
    calculating, by one or more computer processors, a risk indicator associated with the incoming data from the source based upon the identified data related to the source, the identified data related to the recipient, the identified one or more key words, and the determined relationship between the source and the recipient; and
    sending, by one or more computer processors, a notification to the recipient, wherein the notification includes at least the calculated risk indicator.

2. The method of claim 1, wherein data related to the source comprises information input by a user of the source and comprises a telephone number for the source.

3. The method of claim 2, wherein the information input by the user of the source includes one or more of: a text message, a photograph, and an audio message, wherein the information input by the user of the source is sent to the recipient of the incoming data prior to establishing a connection between the source and the recipient.

4. The method of claim 1, wherein determining the relationship further comprises:
    identifying, by one or more computer processors, a first social media profile belonging to a user of the source;
    identifying, by one or more computer processors, a second social media profile for a user of the recipient; and
    determining, by one or more computer processors, a relationship between the first social media profile of the user of the source and the second social media profile for the user of the recipient of the incoming data based upon a number of shared connections of the first social media profile and the second social media profile.

5. The method of claim 1, wherein calculating, by one or more computer processors, a risk indicator associated with the incoming data from source based upon the identified data related to the source, the identified data related to the recipient and the determined relationship between the source and the recipient comprises:
    identifying, by one or more computer processors, one or more of a location of origin for the source and one or more identities associated with the source; and
    calculating, by one or more computer processors, a risk indicator associated with the incoming data from the source based at least in part on the identified one or more of a location of origin for the source and one or more identities associated with the source.

6. The method of claim 5, wherein calculating, by one or more computer processors, a risk indicator associated with the incoming data from the source based upon the identified data related to the source, the identified data related to the recipient and the determined relationship between the source and the recipient comprises:
    identifying, by one or more computer processors, one or more previous actions of a user of the recipient of the incoming data based on the identified one or more of a location of origin for the source, one or more key words from a textual message from the source, and one or more identities associated with the source; and
    calculating, by one or more computer processors, a risk indicator associated with the incoming data from the source based at least in part on the one or more previous actions.

7. The method of claim 1, further comprising:
    generating, by one or more computer processors, a profile for the source based on (i) the identified data related to the source, (ii) the determined relationship between the source and the recipient, and (iii) the calculated risk indicator, wherein the generated profile includes information about the source.

8. A computer program product for calculating risk associated with a source, the computer program product comprising:

one or more computer readable storage media and program instructions stored on the one or more computer readable storage media, the program instructions comprising:

program instructions to identify incoming data related to a source;

program instructions to identify data related to a recipient of incoming data from the source;

program instructions to determine a relationship between the source and the recipient of the incoming data from the source;

program instructions to identify one or more key words from a textual message from the source;

program instructions to calculate a risk indicator associated with the incoming data from the source based upon the identified data related to the source, the identified data related to the recipient, the identified on or more keywords, and the determined relationship between the source and the recipient; and program instructions to send a notification to the recipient, wherein the notification includes at least the calculated risk indicator.

9. The computer program product of claim 8, wherein data related to the source comprises information input by a user of the source and comprises a telephone number for the source.

10. The computer program product of claim 9, wherein the information input by the user of the source includes one or more of: a text message, a photograph, and an audio message, wherein the information input by the user of the source is sent to the recipient of the incoming data prior to establishing a connection between the source and the recipient.

11. The computer program product of claim 8, wherein determining the relationship further comprises:

program instructions to identify a first social media profile belonging to a user of the source;

program instructions to identify a second social media profile for a user of the recipient; and program instructions to determine a relationship between the first social media profile of the user of the source and the second social media profile for the user of the recipient of the incoming data based upon a number of shared connections of the first social media profile and the second social media profile.

12. The computer program product of claim 8, wherein program instructions to calculate a risk indicator associated with the incoming data from source based upon the identified data related to the source, the identified data related to the recipient and the determined relationship between the source and the recipient comprises program instructions to:

identify one or more of a location of origin for the source and one or more identities associated with the source; and calculate a risk indicator associated with the incoming data from the source based at least in part on the identified one or more of a location of origin for the source and one or more identities associated with the source.

13. The computer program product of claim 12, wherein program instructions to calculate a risk indicator associated with the incoming data from the source based upon the identified data related to the source, the identified data related to the recipient and the determined relationship between the source and the recipient comprises program instructions to:

identify one or more previous actions of a user of the recipient of the incoming data based on the identified one or more of a location of origin for the source, one or more key words from a textual message from the source, and one or more identities associated with the source; and calculate a risk indicator associated with the incoming data from the source based at least in part on the one or more previous actions.

14. The computer program product of claim 8, further comprising program instructions to:

generate a profile for the source based on (i) the identified data related to the source, (ii) the determined relationship between the source and the recipient, and (iii) the calculated risk indicator, wherein the generated profile includes information about the source.

15. A computer system for calculating risk associated with a source, the computer system comprising:

one or more computer processors;

one or more computer readable storage media;

program instructions stored on the computer readable storage media for execution by at least one of the one or more computer processors, the program instructions comprising:

program instructions to identify incoming data related to a source;

program instructions to identify data related to a recipient of incoming data from the source;

program instructions to determine a relationship between the source and the recipient of the incoming data from the source;

program instructions to one or more key words from a textual message from the source;

program instructions to calculate a risk indicator associated with the incoming data from the source based upon the identified data related to the source, the identified data related to the recipient, the identified one or more key words, and the determined relationship between the source and the recipient; and program instructions to send a notification to the recipient, wherein the notification includes at least the calculated risk indicator.

16. The computer system of claim 15, wherein data related to the source comprises information input by a user of the source and comprises a telephone number for the source.

17. The computer system of claim 16, wherein the information input by the user of the source includes one or more of: a text message, a photograph, and an audio message, wherein the information input by the user of the source is sent to the recipient of the incoming data prior to establishing a connection between the source and the recipient.

18. The computer system of claim 15, wherein determining the relationship further comprises:

program instructions to identify a first social media profile belonging to a user of the source;

program instructions to identify a second social media profile for a user of the recipient; and program instructions to determine a relationship between the first social media profile of the user of the source and the second social media profile for the user of the recipient of the incoming data based upon a number of shared connections of the first social media profile and the second social media profile.

19. The computer system of claim 15, wherein program instructions to calculate a risk indicator associated with the incoming data from source based upon the identified data related to the source, the identified data related to the recipient and the determined relationship between the source and the recipient comprises program instructions to:
- identify one or more of a location of origin for the source and one or more identities associated with the source; and
- calculate a risk indicator associated with the incoming data from the source based at least in part on the identified one or more of a location of origin for the source and one or more identities associated with the source.

20. The computer system of claim 19, wherein program instructions to calculate a risk indicator associated with the incoming data from the source based upon the identified data related to the source, the identified data related to the recipient and the determined relationship between the source and the recipient comprises program instructions to:
- identify one or more previous actions of a user of the recipient of the incoming data based on the identified one or more of a location of origin for the source, one or more key words from a textual message from the source, and one or more identities associated with the source; and
- calculate a risk indicator associated with the incoming data from the source based at least in part on the one or more previous actions.

* * * * *